June 4, 1946. J. M. CROM Re. 22,762
METHOD OF AND APPARATUS FOR TENSIONING WIRE
Original Filed March 20, 1944 2 Sheets-Sheet 1
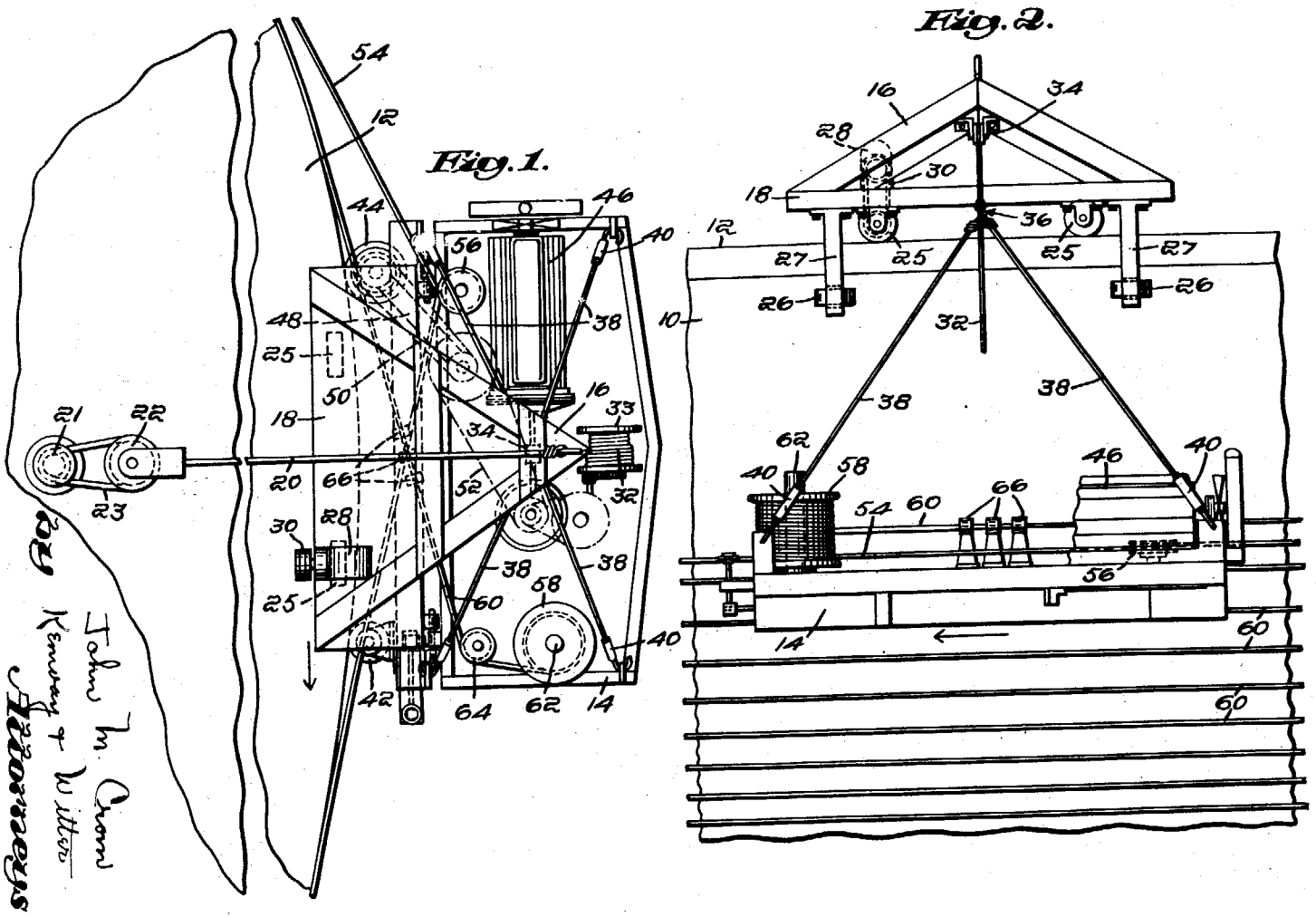
John M. Crom
By Kenway & Witter
Attorneys June 4, 1946. J. M. CROM Re. 22,762

METHOD OF AND APPARATUS FOR TENSIONING WIRE

Original Filed March 20, 1944 2 Sheets-Sheet 2

John M. Crom
By Kenway & Witter
Attorneys

Reissued June 4, 1946

Re. 22,762

UNITED STATES PATENT OFFICE 22,762

METHOD OF AND APPARATUS FOR TENSIONING WIRE

John M. Crom, Washington, D. C.

Original No. 2,385,796, dated October 2, 1945, Serial No. 527,188, March 20, 1944. Application for reissue November 20, 1945, Serial No. 629,895

5 Claims. (Cl. 242—7)

Figure 3:
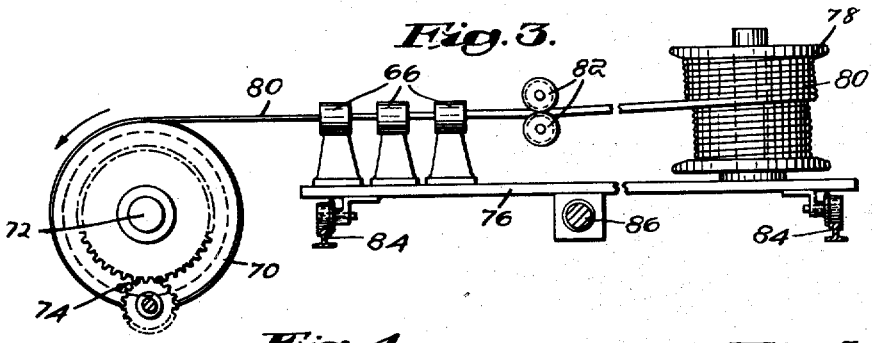

This application is a continuation in part of my copending application Serial No. 492,441, filed June 26, 1943, now Patent No. 2,372,060, for Method and apparatus for banding tanks. In that application I disclosed a novel method of and apparatus for banding with wire under predetermined tension but, in describing the wire tensioning means as a resistance member adapted tightly to grip the wire and place it under a predetermined tension, I failed fully to describe the gripping member and its deforming action on the wire that is necessary to produce the required tension. Such description will be made complete in this application.

Concrete tanks, pipes and the like have heretofore been reinforced and placed under compression by banding the same with wire, as in Patents 2,175,479 and 2,215,361 and in my Patent No. 2,370,780. Such banding must be performed with the wire under a very substantial predetermined tension whereby to place the banding object under a high compression capable of withstanding a considerable expansive load. This tensioning of the wire has heretofore required complex and expensive braking mechanism which must be maintained to function accurately and uniformly and the high tension required very substantially complicates this maintenance. The substitution of wire gripping and tensioning means of the nature shown in Patent 1,006,173 is wholly inadequate and not capable of producing the required tension. I have discovered a relatively simple method whereby the wire can not only be maintained under the required tension up to its maximum strength but also whereby the tension at which the wire will be banded can be accurately predetermined, the method being not only relatively simple but furthermore employing only relatively simple and inexpensive mechanism.

My invention contemplates placing and permanently holding a body, such as a concrete body, under high compression load by the application of reinforcement wire under predetermined tension in compressive contact therewith and, in accordance with the invention, I secure the desired tension by mechanically deforming the wire to a predetermined extent as it is being placed for use, such as being laid in place on an object being banded, the deforming effort required serving to maintain the wire under the predetermined tension. The deforming is effected by passing the wire through one or more orifices or the like constructed to deform the wire in a manner modifying its cross-sectional shape or area, the wire being continuously pulled through the orifice from an anchored point of contact, such as an object being banded. The amount of deformation required to produce a desired tension will vary with the quality and chemical composition of the wire employed and I have found that this relationship is so constant that the tension at which a wire of given size and character will be brought in accordance with my invention can be predetermined with great accuracy. For example, I have employed a #8 gauge steel wire having an original diameter of .162 inch in the banding of tanks at a tension of 150,000 p. s. i. and I have found that the passing of this wire through an orifice which reduces its diameter to .140 inch will produce this required tension. In the case of a harder or higher carbon content wire a lesser deformation will be necessary and conversely in the case of a softer wire. It will thus be apparent that my invention provides a relatively simple and convenient method of and apparatus for tensioning wire reinforcement or banding with wire at any predetermined tension up to its maximum strength and the predetermining of the tension which will be applied to the wire. The primary object of my invention resides in the production of such an improved method and apparatus for thus placing a reinforcement wire under tension, preferably predetermined, and the banding or compressing a body with wire at predetermined tension.

These and other features of the invention will be best understood and appreciated from the following description of preferred embodiments thereof selected for purposes of illustration and shown in the accompanying drawings in which—

Fig. 1 is a fragmentary plan view of an apparatus for banding a tank in accordance with my invention, Fig. 2 is a fragmentary front elevation thereof, Fig. 3 is a fragmentary view illustrating the banding of a rotatable cylinder in accordance with my invention.

Figure 4:
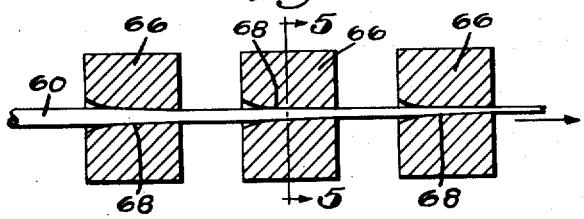
Figure 5:
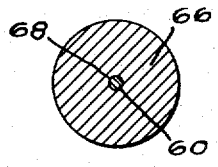
Figure 6:
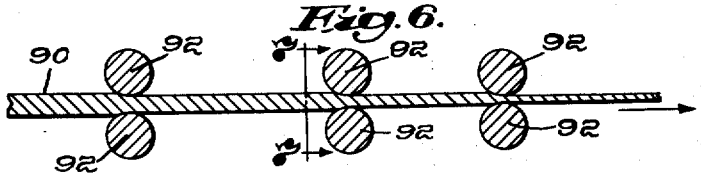
Figure 7:
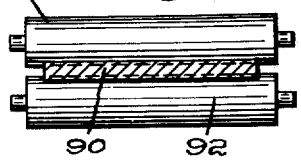

Fig. 4 is an enlarged fragmentary sectional view longitudinally through the wire deforming and tensioning elements shown in Figs. 1–3, Fig. 5 is a cross section through one of the elements, taken on line 5—5 of Fig. 4, Fig. 6 is a fragmentary sectional view of a series of cooperating rollers employed in deforming and tensioning flat wire in accordance with my invention, and Fig. 7 is a cross sectional view through the wire, taken on line 7—7 of Fig. 6.

In Figs. 1 and 2 I have illustrated the invention as applied to the banding of tanks with round wire. Reference character 10 indicates the cylindrical side wall of a concrete tank having a dome or cover 12 thereon. The invention contemplates the employment of a vehicle for conducting the wire around the tank and laying it in contact with the side wall. The vehicle can be supported in any convenient and desirable manner for performing this function, as by suspending the vehicle from above as illustrated in the drawings. In any event the vehicle is mounted to move around the tank and trail the banding wire therefrom and into predetermined tensioned contact with the tank.

As illustrated, 14 indicates a vehicle or platform suspended from a boom 16 to a position overhanging the outer face of the side wall 10. The boom is supported on a carriage 18 in rolling contact with the top of the tank and anchored by a cable 20 for swiveling movement about a fixed post 21 at the central vertical axis of the tank, the cable being connected to a pulley 22 engaging an endless band 23 looped around the post. The carriage 18 is supported on wheels 25 resting on the tank cover 12 and rotatable on horizontal axes and also by wheels 26 carried on brackets 27, the wheels 26 being rotatable on vertical axes and in contact with the side wall 10. The carriage 18 is adapted to be driven by a motor 28 through a belt 30 to one of the wheels 25 (Fig. 2) as more particularly described in my Patent No. 2,370,780.

The vehicle or platform 14 is suspended from the boom 16 by means of a cable 32 wound on a drum 33 on the vehicle and extending over a sheave 34 supported on the boom. The free end of the cable carries a ring at 36 to which is connected four cables 38 having their lower ends secured to the four corners of the vehicle, turnbuckles 40 being provided to level the vehicle. The vehicle is supported laterally by a front wheel 42 and a rear traction wheel 44 engaging the side wall 10 of the tank. An engine 46 mounted on the vehicle is provided with driving connections to the drum 33 and the traction wheel 44 for elevating the vehicle and driving it around the tank, all as more fully described in my Patent 2,364,696, dated December 12, 1944.

The traction wheel is mounted on the free end of an arm 48 pivoted to the vehicle and is driven by the engine 46 through chains 50 and 52, means being provided for pivotally adjusting the arm relative to the vehicle. An endless cable 54 extending around the tank and about a sheave 56 on the vehicle supports the vehicle against lateral movement outwardly away from the tank.

A roll 58 of banding wire 60 is supported on a post 62 on the vehicle and extends therefrom over a guiding sheave 64 and through one or more wire deforming and tensioning elements 66 carried by the vehicle. As illustrated more specifically in Fig. 4, the wire passes through orifices 68 in these elements which deform the wire in a direction reducing its size. The vehicle is driven in the direction indicated by the arrows and trails the banding wire 60 onto the tank following its passage through the elements 66. The total deformation of the wire is very carefully predetermined since the tensioning exerted on the wire as it is applied to the tank is proportionate thereto. The wire is therefore banded onto the tank under a required tension predetermined by the amount of deformation or reduction in size of the wire as it is applied to the tank.

As will be apparent, the invention is also applicable to the banding of smaller objects which can be rotated to effect the banding operation. In Fig. 3 I have illustrated a concrete pipe 70 mounted to be rotated about an axis 72 by means of gearing 74. An adjacent carriage 76 supports a roll 78 of wire 80 to be banded onto the pipe. The wire passes from the roll to guiding sheaves 82 and from thence through a plurality of wire deforming and tensioning elements 66 which place the desired tension on the wire as it passes therethrough and is wrapped about the pipe. The carriage is mounted on tracks 84 and screw threaded means 86 is provided for moving the carriage longitudinally of the pipe at a predetermined rate in the banding operation, thereby wrapping the wire helically around the pipe.

While banding under tension ordinarily employs round steel wire, it will be apparent that the invention is not limited to the shape or character of wire employed. In a co-pending application Serial No. 535,353, filed May 12, 1944, by Curzon Dobell, is disclosed the banding of tanks with flat wire and my invention is wholly applicable to use in such banding. In Figs. 6 and 7 I have illustrated a flat wire 90 extending through the orifices provided between three pairs of rollers 92, each successive pair being so spaced apart as to deform the wire to a lesser thickness as it passes therebetween in the direction of the arrow. The rollers are suitably supported and maintained in their proper spacing and the banding operation is substantially the same as above described in connection with the elements 66.

Having now described and illustrated my invention, what I claim as new and desire to secure by Letters Patent of the United States is:

1. A method of tightly banding an object circumferentially with continuous wire reinforcement, which consists in passing a banding wire from a supply point through a reducing orifice and from thence into contact with the object to be banded, and continuously banding the wire onto and around the object while maintaining a relative movement of the orifice and wire in a direction passing the wire through the orifice to the object and exerting the wire reducing pull of the orifice on and along the wire to and against the object.

2. A method of banding wire under a predetermined tension around an object, which consists in predetermining the amount of cold drawing reduction in the size of the wire that is required to produce said tension in the wire, and wrapping the wire under said tension around the object by passing the wire thereto through an orifice effecting said reduction by a pull on the wire against the object.

3. A method of placing tanks and the like under compression by banding them circumferentially with continuous wire reinforcement under a predetermined tension, which consists in moving a vehicle around the tank, wrapping the wire from the vehicle around and into contact with the tank while placing the wire under said predetermined tension as it is applied to the tank by passing the wire through an orifice carried by the vehicle and of a character so to change the cross-sectional shape of the wire as to place said predetermined tension thereon and against the tank at its point of application as the orifice is moved with the vehicle along the wire in a direction away from said point of application.

4. Apparatus for placing tanks and the like under compression by banding them circumferentially with continuous wire reinforcement under tension, comprising a vehicle, means supporting the vehicle for movement around and adjacent to the outer side face of a tank, means including an engine for driving the vehicle, and means on the vehicle for supporting a wire and wrapping it under tension circumferentially into contact with said face as the vehicle travels around the tank, the last named means including a wire deforming member having an orifice through which the wire passes and which orifice is of a character to modify the shape of the wire passing therethrough and thereby place the wire in substantial tension as it is wrapped onto said face.

5. A method of placing and permanently holding concrete under high compression load, which consists in applying reinforcement wire under predetermined tension in compressive contact therewith, and including the steps of extending the wire through a reducing orifice of a size to effect such reduction in the size of the wire as will produce said predetermined tension in the wire, anchoring the reduced and smaller end of the wire, effecting a relative movement of the orifice and wire by passing the wire through the orifice in the direction of said anchored end and exerting the reducing pull of the orifice thereagainst on and along the portion of wire disposed between said anchored end and the orifice, and bringing the concrete and wire into contact while the wire is held under tension of said reducing pull.

JOHN M. CROM.